United States Patent
Kim et al.

(10) Patent No.: US 9,749,945 B2
(45) Date of Patent: Aug. 29, 2017

(54) METHOD FOR SELECTING ACCESS NETWORK IN WIRELESS COMMUNICATION SYSTEM AND APPARATUS THEREFOR

(71) Applicant: LG ELECTRONICS INC., Seoul (KR)

(72) Inventors: Laeyoung Kim, Seoul (KR); Jaehyun Kim, Seoul (KR); Taehyeon Kim, Seoul (KR); Hyunsook Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/773,779

(22) PCT Filed: Mar. 25, 2014

(86) PCT No.: PCT/KR2014/002494
§ 371 (c)(1),
(2) Date: Sep. 9, 2015

(87) PCT Pub. No.: WO2014/157912
PCT Pub. Date: Oct. 2, 2014

(65) Prior Publication Data
US 2016/0021605 A1    Jan. 21, 2016

Related U.S. Application Data

(60) Provisional application No. 61/805,902, filed on Mar. 27, 2013.

(51) Int. Cl.
*H04W 48/18* (2009.01)
*H04W 8/02* (2009.01)
(Continued)

(52) U.S. Cl.
CPC ............. *H04W 48/18* (2013.01); *H04W 8/02* (2013.01); *H04W 28/0284* (2013.01);
(Continued)

(58) Field of Classification Search
None
See application file for complete search history.

(56) References Cited

U.S. PATENT DOCUMENTS

2006/0111107 A1 * 5/2006 Zhang .................... H04L 63/10
455/435.2
2012/0257598 A1   10/2012 Karampatsis et al.
(Continued)

FOREIGN PATENT DOCUMENTS

WO    2013/022220 A1    2/2013

*Primary Examiner* — Kodzovi Acolatse
(74) *Attorney, Agent, or Firm* — Dentons US LLP

(57) ABSTRACT

Disclosed are a method for selecting an access network in a wireless communications system and an apparatus therefor. In a wireless communications system, a method for a terminal to select an access network according to an embodiment of the present invention includes the steps of: receiving the policy information of a first network; receiving the policy information of a second network; determining the load value of a WLAN (Wireless Local Area Network) access network; and comparing the load value with a predetermined reference value so as to determine whether the WLAN access network is overloaded. The predetermined value can be determined by comparing first reference information for determination of the WLAN access network overload contained in the policy information of the first network with second reference information for determination of the WLAN access network overload contained in the policy information of the second network.

13 Claims, 7 Drawing Sheets

(51) Int. Cl.
  *H04W 28/02*   (2009.01)
  *H04W 84/12*   (2009.01)
  *H04W 88/02*   (2009.01)
  *H04W 8/12*    (2009.01)

(52) U.S. Cl.
  CPC .............. *H04W 8/12* (2013.01); *H04W 84/12* (2013.01); *H04W 88/02* (2013.01)

(56) References Cited

U.S. PATENT DOCUMENTS

| | | | |
|---|---|---|---|
| 2013/0044709 A1 | 2/2013 | Adjakple et al. | |
| 2013/0070644 A1 | 3/2013 | McCann et al. | |
| 2014/0213256 A1* | 7/2014 | Meylan | H04W 36/22 455/436 |
| 2015/0156705 A1* | 6/2015 | Punz | H04W 48/10 370/328 |
| 2015/0289186 A1* | 10/2015 | Stalnacke | H04W 48/14 370/236 |

* cited by examiner (a) control-plane protocol stack (b) user-plane protocol stack

METHOD FOR SELECTING ACCESS NETWORK IN WIRELESS COMMUNICATION SYSTEM AND APPARATUS THEREFOR

This application is a 35 U.S.C. §371 National Stage Entry of International Application No. PCT/KR2014/002494 filed Mar. 25, 2014, which claims benefit of and priority to U.S. Provisional Application No. 61/805,902 filed Mar. 27, 2013, both of which are incorporated by reference for all purposes as if fully set forth herein.

TECHNICAL FIELD

The present invention relates to a wireless access system, and more particularly, to a method for selecting an access network in a wireless communications system and an apparatus therefor.

BACKGROUND ART

Network environments may include a cellular access network (e.g., 3rd Generation Partnership Project (3GPP) Global System for Mobile communication (GSM), Universal Mobile Telecommunication System (UMTS), Evolved Packet System (EPS), etc.) and a wireless local access network (WLAN). To fully and complementarily utilize a dual accessibility to the cellular access network and the WLAN, demands for dual mode equipments are increasing.

Generally, a user equipment located in a visited network may use a policy provided by the visited network. However, if a policy provided by a home network and the policy from the visited network are differently provided to a random user equipment, a problem may occur in that it is ambiguous what policy the user equipment should comply is. Particularly, if the user equipment tries to access the WLAN from the visited network, a reference for determining whether to access the corresponding WLAN causes a difference between the policy provided from the home network and the policy provided from the visited network, whereby a problem may occur in that it is ambiguous what policy the user equipment should comply is.

DISCLOSURE

Technical Problem

An object of the present invention is to provide a method for selecting an access network from a visited network and an apparatus therefor.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

To achieve the above technical problem, according to one embodiment of the present invention, a method for enabling a user equipment to select an access network in a wireless communications system comprises the steps of receiving policy information of a first network; receiving policy information of a second network; determining a load value of a WLAN (Wireless Local Area Network) access network; and comparing the load value with a predetermined reference value so as to determine whether the WLAN access network is overloaded, in accordance with the compared result, wherein the predetermined reference value is determined by comparing first reference information for determination of overload of the WLAN access network, which is included in the policy information of the first network, with second reference information for determination of overload of the WLAN access network, which is included in the policy information of the second network.

To achieve the above technical problem, according to another embodiment of the present invention, a user equipment for selecting an access network in a wireless communication system comprises a transceiver; and a processor, wherein the processor is configured to receive policy information of a first network through the transceiver, receive policy information of a second network through the transceiver, determine a load value of a WLAN (Wireless Local Area Network) access network, and compare the load value with a predetermined reference value so as to determine whether the WLAN access network is overloaded, in accordance with the compared result, and the predetermined reference value is determined by comparing first reference information for determination of overload of the WLAN access network, which is included in the policy information of the first network, with second reference information for determination of overload of the WLAN access network, which is included in the policy information of the second network.

Followings may be applied to the embodiments according to the present invention.

The predetermined reference value may be determined by a lower value of a value of the first reference information and a value of the second reference information.

Information indicating that the predetermined reference value is determined by a lower value of a value of the first reference information and a value of the second reference information may be provided to the user equipment by the policy information of the first network or the policy information of the second network.

The method may further comprise the step of trying to access the WLAN access network if the WLAN access network is not overloaded.

At least one of the first reference information and the second reference information may include at least one or more of BSS (Basic Service Set) load information, backhaul network speed information, and WLAN load information.

The user equipment may be configured to be operated in accordance with the policy of the first network for an operation other than the operation of determining whether the WLAN access network is overloaded.

The user equipment may be configured to be operated in accordance with the policy of the second network for an operation other than the operation of determining whether the WLAN access network is overloaded.

The policy information of the first network may be provided to the user equipment by an ANDSF (access network discovery and selection function) that belongs to the first network, and the policy information of the second network may be provided to the user equipment by an ANDSF that belongs to the second network.

The first network may be an HPLMN (home public land mobile network), and the second network may be a VPLMN (Visited PLMN).

The first network may be a VPLMN, and the second network may be an HPLMN.

The user equipment may be in roaming.

The WLAN access network may be located in a visited network.

AVPLMN of a cellular access network accessed by the user equipment may be different from a VPLMN to which the WLAN belongs.

A VPLMN of a cellular access network accessed by the user equipment may be the same as a VPLMN to which the WLAN belongs.

The aforementioned embodiments and the following detailed description of the present invention are only exemplary, and are intended for additional description of the present invention cited in claims.

Advantageous Effects

According to the embodiment of the present invention, a method for selecting an access network from a visited network and an apparatus therefor may be provided, whereby network resources may be used efficiently and user experience may be improved.

It will be appreciated by persons skilled in the art that that the effects that could be achieved with the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE FOR CARRYING OUT THE INVENTION

Figure 1:
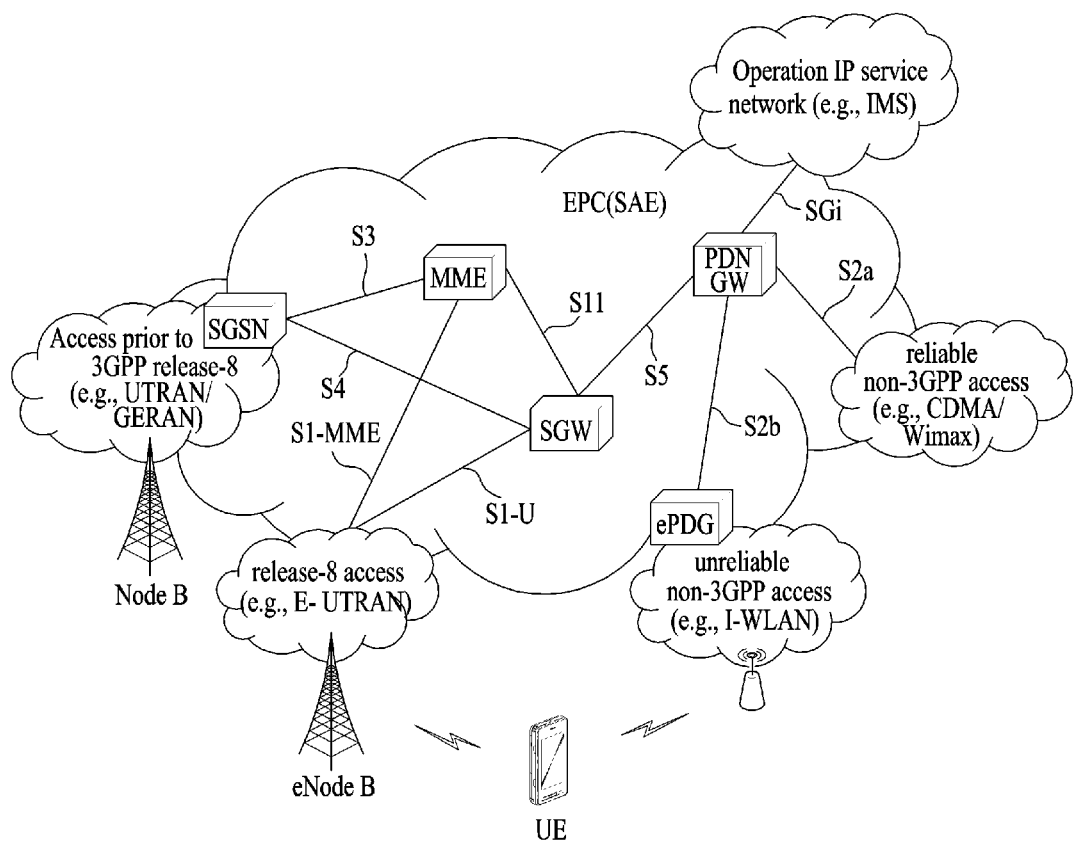
FIG. 1 is a diagram illustrating a brief structure of an Evolved Packet System (EPS) that includes an Evolved Packet Core (EPC)

The following embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment.

Specific terminologies hereinafter used in the embodiments of the present invention are provided to assist understanding of the present invention, and various modifications may be made in the specific terminologies within the range that they do not depart from technical spirits of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention may be supported by standard documents disclosed in at least one of wireless access systems, i.e., IEEE 802 system, 3GPP system, 3GPP LTE system, 3GPP LTE-A (LTE-Advanced) system, and 3GPP2 system. Namely, among the embodiments of the present invention, apparent steps or parts, which are not described to clarify technical spirits of the present invention, may be supported by the above documents. Also, all terminologies disclosed herein may be described by the above standard documents.

The following technology may be used for various wireless communication systems. Although the following description will be made based on the 3GPP LTE and 3GPP LTE-A system for clarification, it is to be understood that the technical spirits of the present invention are not limited to the 3GPP LTE and 3GPP LTE-A system.

Terminologies used herein will be defined as follows.

UMTS (Universal Mobile Telecommunications System): GSM (Global System for Mobile Communication) based third generation mobile communication technology developed by the 3GPP.

EPS (Evolved Packet System): Network system that includes an EPC (Evolved Packet Core) which is an IP based packet switched core network and an access network such as LTE and UTRAN. This system is the network of an evolved version of the UMTS.

NodeB: Base station of GERAN/UTRAN. This base station is installed outdoor and its coverage has a scale of a macro cell.

eNodeB: Base station of LTE. This base station is installed outdoor and its coverage has a scale of a macro cell.

HNB (Home NodeB): CPE (Customer Premises Equipment) that provides UTRAN (UMTS Terrestrial Radio Access Network) coverage. More detailed matters may be understood with reference to standard document TS 25.467.

HeNB (Home eNodeB): CPE (Customer Premises Equipment) that provides E-UTRAN (Evolved-UTRAN) coverage. More detailed matters may be understood with reference to standard document TS 36.300.

UE (User Equipment): The UE may be referred to as a terminal, ME (Mobile Equipment), MS (Mobile Station), etc. Also, the UE may be a portable device such as a notebook computer, a cellular phone, a PDA (Personal Digital Assistant), a smart phone, and a multimedia device. Alternatively, the UE may be a non-portable device such as a PC (Personal Computer) and a vehicle mounted device. The UE enables communication through 3GPP spectrum such as LTE and/or non-3GPP spectrum such as WiFi and spectrum for public safety.

RAN (Radio Access Network): Unit that includes NodeB, eNodeB and RNC (Radio Network Controller) for controlling NodeB and eNodeB at a 3GPP network. The RAN exists between the UE and the core network and provides connection to the core network.

MME (Mobility Management Entity): Network node of an EPS network, which performs a mobility management (MM) function and a session management (SM) function.

HLR (Home Location Register)/HSS (Home Subscriber Server): Database having subscriber information within the 3GPP network. The HSS may perform functions such as configuration storage, identity management, and user status storage.

PDN-GW (Packet Data Network-Gateway)/PGW: Network node of an EPS network, which performs a UE IP address allocation function, a packet screening and filtering function and a charging data collection function.

SGW (Serving Gateway): Network node of an EPS network, which performs mobility anchor, packet routing, idle mode packet buffering, triggering for enabling an MME to page a UE.

PCRF (Policy and Charging Rule Function): Network node of an EPS network, which performs policy decision for dynamically applying quality of service (QoS) and charging policy differentiated per service flow.

NAS (Non-Access Stratum): Upper stratum of a control plane between a UE and an MME. This is a functional layer for signaling between a UE and a core network and exchanging a traffic message in an LTE/UMTS protocol stack, supports UE mobility, and supports a session management procedure for establishing and maintaining an IP connection between a UE and a PDN GW.

PDN (Packet Data Network): Network in which a server supporting a specific service (e.g., a multimedia messaging service (MMS) server, a wireless application protocol (WAP) server, etc.) is located.

PDN (Packet Data Network) connection: Logical connection between UE expressed as one IP address (one IPv4 address and/or one IPv6 prefix) and PDN.

APN (Access Point Name): String indicating or identifying a PDN. A requested service or a network (PDN) is accessed through a PGW and the APN is the name (string) previously defined in the network in order to find the PGW. For example, the APN may be expressed by internet.mnc012.mcc345.gprs.

AS (Access-Stratum): Layer that includes a protocol stack between a UE and a radio network or between a UE and an access network and serves to transmit data and a network control signal.

PLMN (Public Land Mobile Network): Network configured for the purpose of providing a mobile communication service to individuals. This network may be configured on a per operator basis.

ANDSF (Access Network Discovery and Selection Function): The ANDSF is an entity that allows a UE to discover a non-3GPP access network (for example, WLAN (or WiFi), Wimax, etc.) in addition to a 3GPP access network (for example, LTE (Long Term Evolution), LTE-A (Advanced), etc.), and provides rules and policies required to access the corresponding networks. The ANDSF may provide the UE with inter-system mobility policy (ISMP), inter-system routing policy (ISRP) or discovery information in accordance with configuration of an operator.

FIG. 1 is a diagram illustrating a brief structure of an Evolved Packet System (EPS) that includes an Evolved Packet Core (EPC).

The EPC is a core element of System Architecture Evolution (SAE) for improving the performance of 3GPP technology. SAE corresponds to a study item for deciding a network structure supporting mobility among various types of network. SAE aims to provide, for example, an optimized packet-based system which supports various radio access technologies based on IP and provides improved data transfer capabilities.

Specifically, the EPC is a core network of an IP mobile communication system for a 3GPP LTE system and may support packet-based real-time and non-real-time services. In a legacy mobile communication system (e.g., 2nd or 3rd generation mobile communication system), a core network function is implemented through two separated sub-domains, e.g., circuit-switched (CS) sub-domain for sound and packet-switched (PS) sub-domain for data. However, in a 3GPP LTE system which is evolved from the 3rd generation communication system, the CS and PS sub-domains are unified into a single IP domain. For example, in the 3GPP LTE system, IP-capable UEs can be connected via an IP-based base station (e.g., eNodeB (evolved Node B)), an EPC, an application domain (e.g., IMS (IP Multimedia Subsystem)). That is, the EPC is a structure inevitably required to implement end-to-end IP service.

The EPC may include various components and FIG. 1 illustrates a few of the components, e.g., Serving GateWay (SGW), Packet Data Network GateWay (PDN GW), Mobility Management Entity (MME), Serving GPRS (General Packet Radio Service) Supporting Node (SGSN), and enhanced Packet Data Gateway (ePDG).

The SGW operates as a boundary point between a Radio Access Network (RAN) and a core network and is an element which performs a function for maintaining a data path between an eNodeB and a PDG GW. In addition, if a UE moves across an area served by an eNodeB, the SGW serves as a local mobility anchor point. That is, packets may be routed via the SGW for mobility in an Evolved-UMTS (Universal Mobile Telecommunications System) Terrestrial Radio Access Network (E-UTRAN) defined after 3GPP Release-8. Further, the SGW may serve as an anchor point for mobility management with another 3GPP network such as RAN defined before 3GPP Release-8, e.g., UTRAN or GSM (Global System for Mobile communication)/EDGE (Enhanced Data rates for GSM Evolution) Radio Access Network (GERAN).

The PDN GW (or P-GW) corresponds to a termination point of a data interface directed to a packet data network. The PDN GW may support policy enforcement features, packet filtering and charging support. In addition, the PDN GW may serve as an anchor point for mobility management with a 3GPP network and a non-3GPP network (e.g., untrusted network such as Interworking Wireless Local Area Network (I-WLAN) and trusted network such as Code Division Multiple Access (CDMA) or WiMax).

Although the SGW and the PDN GW are configured as separate gateways in the network architecture of FIG. 1, the two gateways may be implemented according to a single gateway configuration option.

The MME performs signaling and control functions to support access of a UE for network connection, network resource allocation, tracking, paging, roaming and handover. The MME controls control plane functions related to subscriber and session management. The MME manages a large number of eNodeBs and performs signaling for selection of a typical gateway for handover to another 2G/3G network. In addition, the MME performs security procedures, terminal-to-network session handling, idle terminal location management, etc.

The SGSN handles all packet data such as mobility management and authentication of a user for another 3GPP network (e.g., GPRS network).

The ePDG serves as a security node for an untrusted non-3GPP network (e.g., I-WLAN, Wi-Fi hotspot, etc.).

As described above in relation to FIG. 1, an IP-capable UE may access an IP service network (e.g., IMS) provided by an operator, via various elements in the EPC based on non-3GPP access as well as 3GPP access.

FIG. 1 also illustrates various reference points (e.g., S1-U, S1-MME, etc.). In the 3GPP system, a conceptual link connecting two functions of different functional entities of E-UTRAN and EPC is defined as a reference point. Table 1 lists the reference points illustrated in FIG. 1. In addition to the examples of Table 1, various reference points may be present according to network architectures.

TABLE 1

| Reference Point | Description |
| --- | --- |
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS Core and the 3GPP Anchor function of Serving GW. In addition, if Direct Tunnel is not established, it provides the user plane tunneling. |
| S5 | It provides user plane tunneling and tunnel management between Serving GW and PDN GW. It is used for Serving GW relocation due to UE mobility and if the Serving GW needs to connect to a non-collocated PDN GW for the required PDN connectivity. |
| S11 | Reference point between MME and SGW |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses. |

Among the reference points illustrated in FIG. 1, S2a and S2b correspond to non-3GPP interfaces. S2a is a reference point for providing a user plane with related control and mobility support between the trusted non-3GPP access and the PDNGW. S2b is a reference point for providing a user plane with related control and mobility support between the ePDG and the PDNGW.

Figure 2:
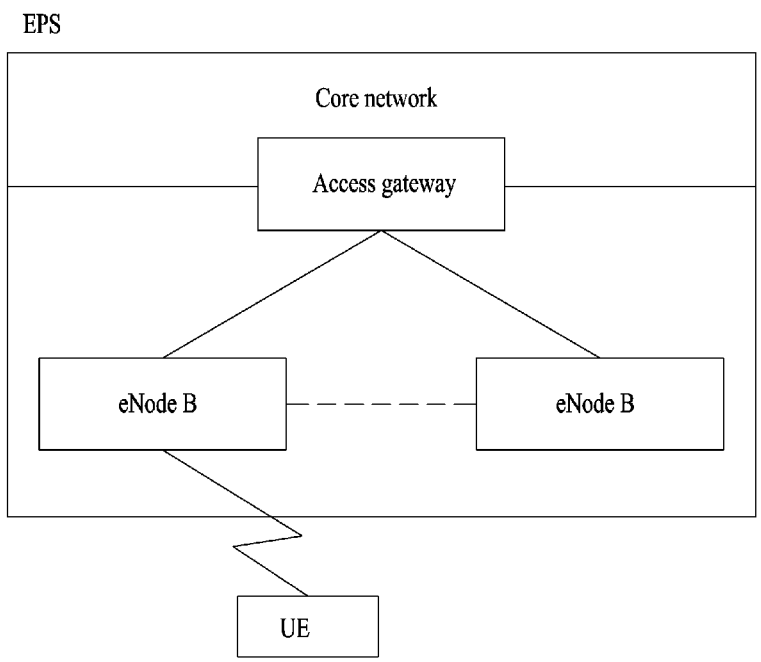
FIG. 2 is a diagram briefly illustrating a network structure of an evolved universal terrestrial radio access network (E-UTRAN) connected to EPC as an example of a wireless communication system.

FIG. 2 is a diagram briefly illustrating a network structure of an evolved universal terrestrial radio access network (E-UTRAN) connected to EPC as an example of a wireless communication system. The EPS (Evolved Packet System) is an evolved version of the conventional UMTS, and its basic standardization is in progress under the 3rd Generation Partnership Project (3GPP). Generally, the EPS may be referred to as a Long Term Evolution (LTE) system. For details of the technical specifications of the UMTS and EPS, refer to Release 7 and Release 8 of "3rd Generation Partnership Project; Technical Specification Group Radio Access Network".

Referring to FIG. 2, the EPS includes a User Equipment (UE), a base station (eNode B; eNB), and an Access Gateway (AG) which is located at an end of a network (E-UTRAN) and connected to an external network. The base station may simultaneously transmit multiple data streams for a broadcast service, a multicast service and/or a unicast service.

One or more cells may exist for one base station. One cell is set to one of bandwidths of 1.25 MHz, 2.5 MHz, 5 MHz, 10 MHz, 15 MHz, and 20 MHz to provide a downlink or uplink transport service to several user equipments. Different cells may be set to provide different bandwidths. Also, the base station controls data transmission and reception for a plurality of user equipments. The base station transmits downlink (DL) scheduling information of downlink data to the corresponding user equipment to notify the corresponding user equipment of time and frequency domains to which data will be transmitted and information related to encoding, data size, and hybrid automatic repeat and request (HARQ). Also, the base station transmits uplink (UL) scheduling information of uplink data to the corresponding user equipment to notify the corresponding user equipment of time and frequency domains that can be used by the corresponding user equipment, and information related to encoding, data size, and HARQ. An interface for transmitting user traffic or control traffic may be used between the base stations. A Core Network (CN) may include an AG and a network node for user registration of the user equipment UE. The AG manages mobility of the user equipment UE on a Tracking Area (TA) basis, wherein one TA includes a plurality of cells.

Although the wireless communication technology developed based on WCDMA has been evolved into LTE, request and expectation of users and providers have continued to increase. Also, since another wireless access technology is being continuously developed, new evolution of the wireless communication technology will be required for competitiveness in the future. In this respect, reduction of cost per bit, increase of available service, use of adaptable frequency band, simple structure and open type interface, proper power consumption of the user equipment, etc. are required.

Recently, standardization of the advanced technology of the LTE is in progress under the 3rd Generation Partnership Project (3GPP). In this specification, the advanced technology will be referred to as 'LTE-A'. One of the important differences between the LTE system and the LTE-A system is the difference in system bandwidth and introduction of a relay station. The LTE-A system aims to support a broad bandwidth of maximum 100 MHz. To this end, the LTE-A system uses the carrier aggregation (CA) technology that achieves a broad bandwidth by using a plurality of frequency blocks. The carrier aggregation (CA) uses a plurality of frequency blocks as one large logic frequency bandwidth to use a wider frequency bandwidth. A bandwidth of each frequency block may be defined on the basis of a bandwidth of a system block used in the LTE system. Each frequency block may be referred to a component carrier (CC) or cell.

Figure 3:
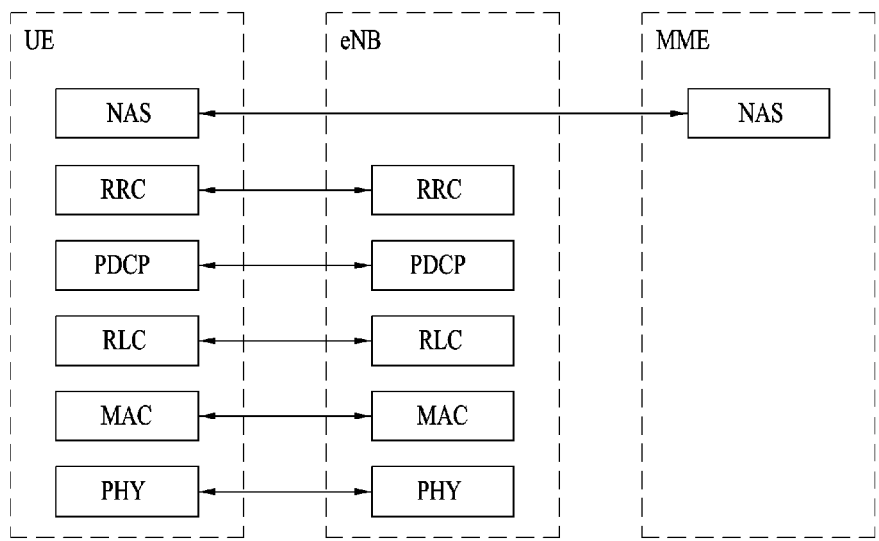
FIG. 3 is a diagram illustrating structures of a control plane and a user plane of a radio interface protocol between a user equipment and an E-UTRAN based on the 3GPP radio access network standard.
Figure 3:
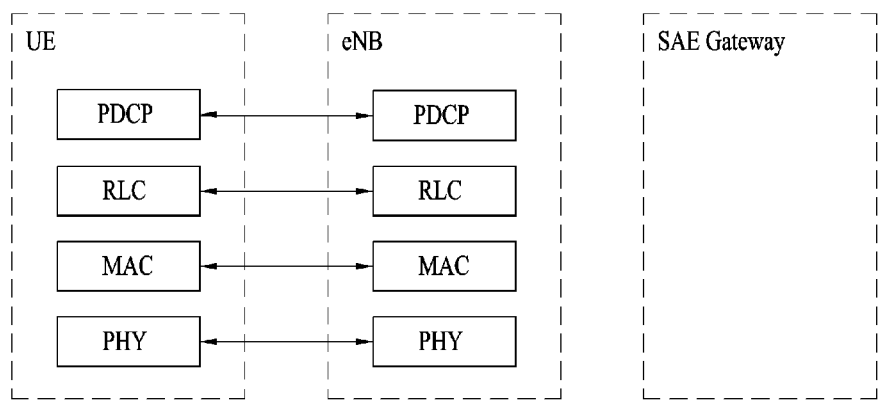

FIG. 3 is a diagram illustrating structures of a control plane and a user plane of a radio interface protocol between a user equipment and E-UTRAN based on the 3GPP radio access network standard. The control plane means a passageway where control messages are transmitted, wherein the control messages are used by the user equipment and the network to manage call. The user plane means a passageway where data generated in an application layer, for example, voice data or Internet packet data are transmitted.

A physical layer, which is the first layer, provides an information transfer service to an upper layer using a physical channel. The physical layer is connected to a medium access control (MAC) layer via a transport channel, wherein the medium access control layer is located above the physical layer. Data are transferred between the medium access control layer and the physical layer via the transport channel. Data are transferred between one physical layer of a transmitting side and the other physical layer of a receiving side via the physical channel. The physical channel uses time and frequency as radio resources. In more detail, the physical channel is modulated in accordance with an orthogonal frequency division multiple access (OFDMA) scheme in a downlink, and is modulated in accordance with a single carrier frequency division multiple access (SC-FDMA) scheme in an uplink.

A medium access control (MAC) layer, which is the second layer, provides a service to a radio link control (RLC) layer above the MAC layer via a logical channel. The RLC layer of the second layer supports reliable data transmission. The RLC layer may be implemented as a functional block inside the MAC layer. In order to effectively transmit data using IP packets such as IPv4 or IPv6 within a radio interface having a narrow bandwidth, a packet data convergence protocol (PDCP) layer of the second layer performs header compression to reduce the size of unnecessary control information.

A radio resource control (RRC) layer located on the lowest part of the third layer is defined in the control plane only. The RRC layer is associated with configuration, re-configuration and release of radio bearers ('RBs') to be in charge of controlling the logical, transport and physical channels. In this case, the RB means a service provided by the second layer for the data transfer between the user equipment and the network. To this end, the RRC layers of the user equipment and the network exchange RRC message with each other. If the RRC layer of the user equipment is RRC connected with the RRC layer of the network, the user equipment is in an RRC connected mode. If not so, the user equipment is in an RRC idle mode. A non-access stratum (NAS) layer located above the RRC layer performs functions such as session management and mobility management.

One cell constituting a base station eNB is set to one of bandwidths of 1.25, 2.5, 5, 10, 15, and 20 MHz and provides a downlink or uplink transmission service to several user equipments. At this time, different cells may be set to provide different bandwidths.

As downlink transport channels carrying data from the network to the user equipment, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH). Meanwhile, as uplink transport channels carrying data from the user equipment to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 4:
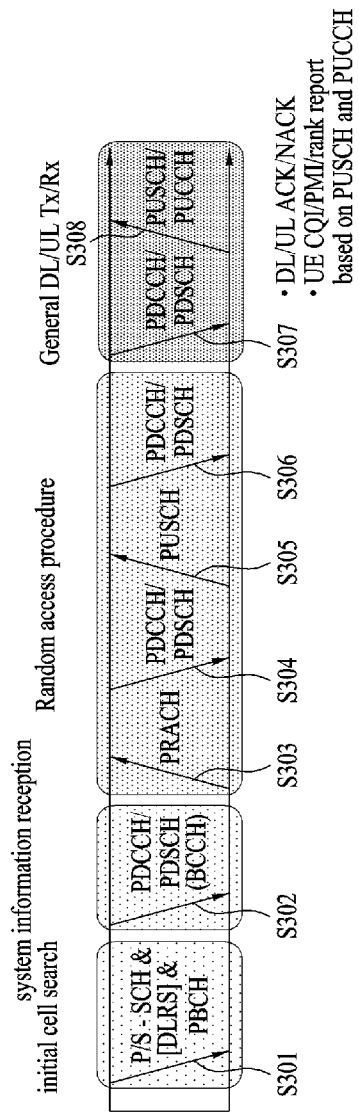
FIG. 4 is a diagram illustrating physical channels used in a 3GPP LTE system and a general method for transmitting a signal using the physical channels.

FIG. 4 is a diagram illustrating physical channels used in a 3GPP LTE system and a general method for transmitting a signal using the physical channels.

When a user equipment is powered on or enters a new cell, the user equipment performs initial cell search such as synchronizing with the base station (S301). To this end, the user equipment synchronizes with the base station by receiving a primary synchronization channel (P-SCH) and a secondary synchronization channel (S-SCH) from the base station, and acquires information such as cell ID, etc. Afterwards, the user equipment may acquire broadcast information within the cell by receiving a physical broadcast channel (PBCH) from the base station. Meanwhile, the user equipment may identify a downlink channel status by receiving a downlink reference signal (DL RS) at the initial cell search step.

The user equipment which has finished the initial cell search may acquire more detailed system information by receiving a physical downlink shared channel (PDSCH) in accordance with a physical downlink control channel (PDCCH) and information carried in the PDCCH (S302).

Meanwhile, if the user equipment initially accesses the base station or if there is no radio resource for signal transmission, the user equipment may perform a random access procedure (RACH) for the base station (S303 to S306). To this end, the user equipment may transmit a preamble through a physical random access channel (PRACH) (S303 and S305), and may receive a response message to the preamble through the PDCCH and the PDSCH corresponding to the PDCCH (S304 and S306). In case of a contention based RACH, the user equipment may additionally perform a contention resolution procedure.

The user equipment which has performed the aforementioned steps may receive the physical downlink control channel (PDCCH)/physical downlink shared channel (PDSCH) (S307) and transmit a physical uplink shared channel (PUSCH) and a physical uplink control channel (PUCCH) (S308), as a general procedure of transmitting uplink/downlink signals. Particularly, the user equipment receives downlink control information (DCI) through the PDCCH. In this case, the DCI includes control information such as resource allocation information for the user equipment, and has different formats depending on its usage.

Meanwhile, control information transmitted from the user equipment to the base station or transmitted from the base station to the user equipment through an uplink includes downlink/uplink ACK/NACK signal, CQI (Channel Quality Indicator), PMI (Precoding Matrix Indicator), and RI (Rank Indicator). In case of the 3GPP LTE system, the user equipment may transmit the aforementioned control information such as CQI/PMI/RI through the PUSCH and/or the PUCCH.

Figure 5:
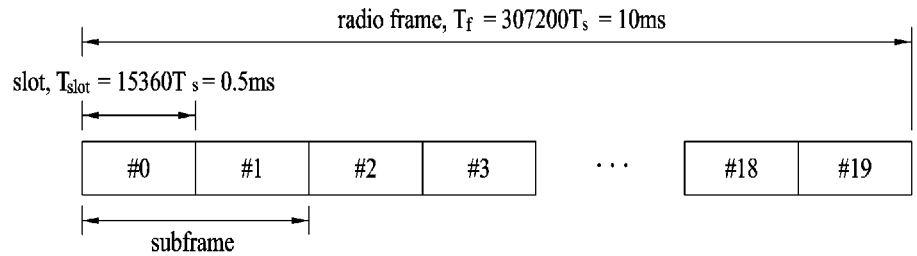
FIG. 5 is a diagram illustrating a structure of a radio frame used in an LTE system.

FIG. 5 is a diagram illustrating a structure of a radio frame used in an LTE system.

Referring to FIG. 5, the radio frame has a length of 10 ms ($327200 \times T_s$) and includes ten (10) subframes of an equal size. Each sub frame has a length of 1 ms and includes two slots. Each slot has a length of 0.5 ms ($15360 \times T_s$). In this case, $T_s$ represents a sampling time, and is expressed by $T_s = 1/(15 \text{ kHz} \times 2048) = 3.2552 \times 10^{-8}$ (about 33 ns). The slot includes a plurality of orthogonal frequency division multiplexing (OFDM) symbols in a time domain, and includes a plurality of resource blocks (RBs) in a frequency domain. In the LTE system, one resource block includes twelve (12) subcarriers×seven (or six) OFDM symbols. A transmission time interval (TTI), which is a transmission unit time of data, may be determined in a unit of one or more subframes. The aforementioned structure of the radio frame is only exemplary, and various modifications may be made in the number of subframes included in the radio frame or the number of slots included in the subframe, or the number of OFDM symbols included in the slot.

In case of a normal cyclic prefix (CP), one subframe includes fourteen (14) OFDM symbols. First one to three OFDM symbols are used as a control region in accordance with subframe configuration, and the other thirteen to eleven OFDM symbols are used as a data region. Examples of the control channel allocated to the control region include a Physical Control Format Indicator Channel (PCFICH), a Physical Hybrid-ARQ Indicator Channel (PHICH), and a Physical Downlink Control Channel (PDCCH).

The PDCCH is allocated to first n number of OFDM symbols of the subframe, wherein n is an integer greater than 1 and is indicated by the PCIFCH. The PDCCH notifies each user equipment or user equipment group of information related to resource allocation of transport channels, i.e., a paging channel (PCH) and a downlink-shared channel (DL-SCH), uplink scheduling grant, HARQ information, etc. The paging channel (PCH) and the downlink-shared channel (DL-SCH) are transmitted through the PDSCH. Accordingly, the base station and the user equipment respectively transmit and receive data through the PDSCH except for specific control information or specific service data.

Information as to user equipment(s) (one user equipment or a plurality of user equipments) to which data of the PDSCH are transmitted, and information as to how the user equipment(s) receives and decodes PDSCH data are transmitted by being included in the PDCCH. For example, it is assumed that a specific PDCCH is CRC masked with radio network temporary identity (RNTI) called "A," and that information on data transmitted using a radio resource (for example, frequency location) called "B" and a DCI format called "C", that is, transmission format information (for example, transport block size, modulation mode, coding information, etc.) is transmitted through a specific subframe. In this case, one or more user equipments located in a corresponding cell monitor the PDCCH in a search space by using their RNTI information, that is, perform blind decoding, and if there are one or more user equipments having RNTI called "A", the user equipments receive the PDCCH, and receive the PDSCH indicated by "B" and "C" through information of the received PDCCH.

Also, the uplink subframe may be divided into a region to which a physical uplink control channel (PUCCH) carrying control information is allocated, and a region to which a physical uplink shared channel (PUSCH) carrying user data is allocated. The center part of the subframe is allocated to the PUSCH, and both parts of the data region in the frequency domain are allocated to the PUCCH. Examples of the control information transmitted on the PUCCH include ACK/NACK used for HARQ, a channel quality indicator (CQI) indicating the state of a downlink channel, a rank indicator (RI) for MIMO, and a scheduling request (SR) corresponding to an uplink resource allocation request.

Figure 6:
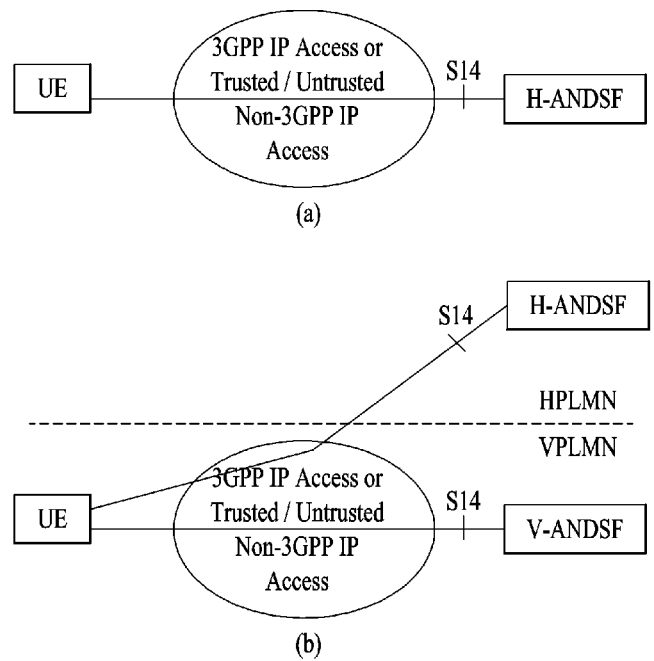
FIGS. 6(a) and 6(b) are diagrams illustrating a structure used in ANDSF.

FIGS. 6(a) and 6(b) are diagrams illustrating a structure used in Access Network Discovery and Selection Functions (ANDSF).

FIG. 6(a) illustrates a non-roaming structure for Access Network Discovery and Selection Functions (ANDSF), and FIG. 6(b) illustrates a roaming structure for ANDSF.

An ANDSF entity located in a home PLMN (HPLMN) of a user equipment UE is referred to as a Home-ANDSF (H-ANDSF), and an ANDSF entity located in a visited PLMN (VPLMN) of the corresponding user equipment UE is referred to as a Visited-ANDSF (V-ANDSF). Unless otherwise specified, the terminology, ANDSF is used to refer to both an H-ANDSF and a V-ANDSF. In the examples of FIGS. 6(a) and 6(b), the use of the ANDSF and interfaces may be optional.

Access Network Selection

In this document, the terminology "a cellular access network" may refer to a cellular radio access network or a core network such as EPC. Examples of a cellular access network may include, but not limited to, a 3GPP access network such as GERAN, UTRAN, E-UTRAN, or a 3GPP2 access network such as CDMA1x, HRPD.

Examples of a WLAN access network may include, but not limited to, a WLAN access network according to IEEE 802.11 series, or Hotspot 2.0.

A dual mode user equipment may support accessibility to both of a cellular access network and a WLAN. The terminology "a dual mode user equipment" may refer to a user equipment having a capability of routing traffic (e.g. IP traffic) simultaneously to a cellular access network and to a WLAN access network, or a user equipment having a capability of routing traffic either to a cellular access network or to a WLAN access network.

Standardization of WLAN Network Selection (WLAN_NS) for 3GPP user equipment has been discussed as a work item in 3GPP Release-12. In more detail, in WLAN_NS, enhanced WLAN network selection for a dual mode equipment supporting a cellular access network and a WLAN access network has been discussed.

One of key issues of WLAN_NS is a simultaneous connectivity to multiple VPLMNs (see Key issue #6 of 3GPP Technical Report (TR) 23.865 v0.5.0 document). For a user equipment simultaneously connected to multiple VPLMNs, it is required to determine a policy to be applied for a user equipment to a visited network (e.g., a corresponding user equipment in roaming state).

In the 3GPP TS 24.234 document, it is assumed that network selection procedure is completely independent of the result of PLMN selection according to another radio access technology disclosed in the 3GPP TS 23.122 document. That is, Network and PLMN selection on the WLAN is performed independently from PLMN selection in the 3GPP access. There is thus the possibility that a user equipment UE simultaneously connected to both 3GPP access and WLAN access selects different VPLMNs from the two accesses.

For the case of ePDG selection, the procedures defined in the 3GPP TS 24.302 and TS 23.402 documents may result in one of the following options: i) If the user equipment UE is attached to a VPLMN in 3GPP access, the user equipment may either find an ePDG in the VPLMN used in the 3GPP access or an ePDG in HPLMN; ii) If the user equipment is attached to HPLMN in 3GPP access, the user equipment finds an ePDG in HPLMN; iii) If the user equipment is not attached in 3GPP access, the user equipment may either find an ePDG in the VPLMN selected in WLAN access or an ePDG in HPLMN. The ePDG selection procedure may result in an ePDG located in VPLMN selected for 3GPP access, an ePDG in VPLMN selected for WLAN access or an ePDG in HPLMN.

Figure 7:
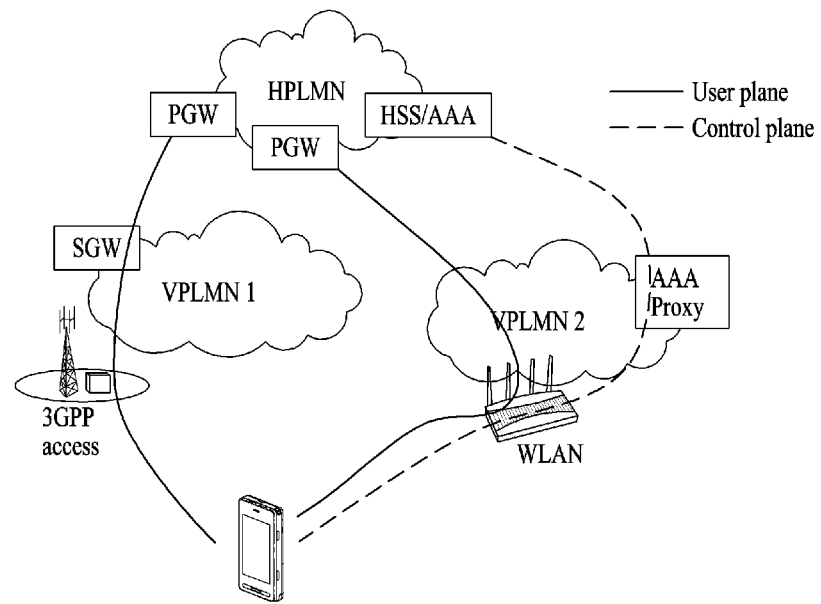
FIGS. 7 and 8 are diagrams exemplarily illustrating that a VPLMN is varied in WLAN access of 3GPP access.
Figure 8:
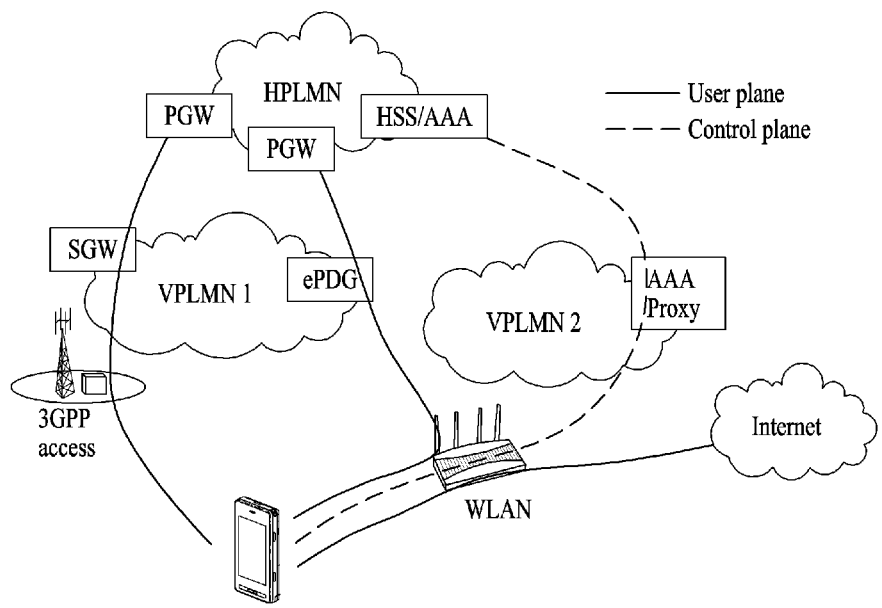

FIG. 7 and FIG. 8 are diagrams illustrating exemplary scenarios with different VPLMN in 3GPP access and WLAN access.

In the example of FIG. 7, the user equipment selects different VPLMNs in 3GPP access and WLAN access through a separate PLMN selection procedure after being attached to both 3GPP access and WLAN access.

In the example of FIG. 8, different VPLMNs are selected from 3GPP access and WLAN access, and an ePDG is selected from 3GPP VPLMN. This scenario may happen when the user equipment is first attached to the 3GPP access and then attached to the WLAN access UE to find an ePDG from 3GPP VPLMN.

The scenario with multiple simultaneous serving PLMNs has not been sufficiently addressed in 3GPP. For a roaming user equipment in such a scenario of FIG. 7 or FIG. 8, issues that may need further resolution include: i) Is the scenario described above valid or should it be avoided? ii) Even though mobility and routing policies from H-ANDSF should as of today not impact the PLMN selection procedures, it is not clear if policies from H-ANDSF apply since an access change would also result in PLMN change. Therefore, it is not clear if policies from any of the two V-ANDSFs should apply to such a scenario.

Therefore, there is a need to clarify ANDSF usage (or V-ANDSF) at each step. Moreover, there is also a need to clarify other aspects related to scenarios where a user equipment is served by different VPLMNs in 3GPP access and WLAN access.

Recently, 3GPP TR 23.865v0.5.0 provides a solution for the aforementioned usage of ANDSF policies in (V)-PLMN.

An ANDSF server provides a user equipment with a policy in order for that the user equipment UE to be able to use more extensive decision-making criteria when determining which access the UE should connect to.

A V-ANDSF server associated with a given VPLMN could be used to download access network selection policies to determine the best access network associated to the corresponding VPLMN. This implies that a V-ANDSF server, belonging to Operator X, may provide policies to a user equipment UE belonging to Operator Y. The current solution is that the user equipment reconciles the policies from V-ANDSF and H-ANDSF and, if there is overlap, gives priority to policies from the V-ANDSF.

As described in the key issue of the simultaneous connectivity to multiple VPLMNs, the user equipment UE may be connected to two different VPLMNs simultaneously, one in 3GPP access and one in WLAN access. In this case, the user equipment may receive policies from two V-ANDSF servers of each VPLMN. It is not clear which V-ANDSF server, if any, shall be used for the policy information or if one of the V-ANDSF servers has priority over the other one.

As for proposed solution, it may be considered to allow the V-ANDSF policies to be taken into account for the case when both 3GPP and non-3GPP accesses connect via the same VPLMN. For this solution, the UE simultaneously accessed to multiple VPLMNs as in FIG. 7 could not use the V-ANDSF in VPLMN1 or VPLMN2, while the UE simultaneously accessed to multiple VPLMNs as in FIG. 8 could use the V-ANDSF for both accesses in VPLMN1. That is, the user equipment may accept policies received from the V-ANDSF server only if the user equipment has single selected VPLMN for all attached accesses. The user equipment cannot accept policies from the V-ANDSF if the user equipment has two or more VPLMNs.

Next, as another key issue of WLAN_NS, consideration of WLAN load information during WLAN network selection has been discussed (see key issue #4 of 3GPP TR 23.865 v0.5.0 document).

Currently, ANDSF does not provide a policy of network selection, which considers information on load or congestion indication of the WLAN network, to the user equipment. If such a policy is provided to the user equipment, conventional WLAN network selection determination may be improved. In the WFA (WiFi Alliance) Hotspot 2.0 standard, a Hotspot 2.0 compatible AP (Access Point) broadcasts BSS (Basic Service Set) load information, and supports ANQP (Access Network Query Protocol) element called WAN metric. The BSS load information element includes population of a radio device within the current BSS, and information on channel usage. The WAN metric ANQP element provides information on a WAN link of the WLAN access network.

The WFA Hotspot 2.0 standard considers that a BSS load policy is specified considering BSS load and backhaul parameters to prevent a radio device from joining a WLAN which is excessively congested due to traffic and/or interference. For WLAN network selection, the dual mode user equipment is operated to use policies (for example, ANDSF MO (Management Object), I-WLAN interworking MO) only specified by the 3GPP standard. Therefore, an improvement solution of the policy specified by the 3GPP standard should be discussed so that the dual mode user equipment may consider the aforementioned parameters defined in the WFA Hotspot 2.0 standard to select a WLAN network.

In this respect, it is required to specifically define whether parameters or information, such as WLAN BSS load, backhaul network speed, and load information, which are defined to specify the WLAN selection policy in the Hotspot 2.0 standard, may be used in the 3GPP standard, or how the parameters or information should be used.

As for the above definition, a policy (for example, information on a threshold value of a value indicating overload/congestion), which is a criterion that the user equipment may determine an overload or congestion state of a random WLAN, may be configured in the ANDSF, whereby the policy may be provided to the user equipment.

For example, the user equipment may determine (for example, estimate, measure or calculate) a load value of a random WLAN access network by using various kinds of load information (for example, BSS load, backhaul network speed, load information, etc. defined in the WFA Hotspot 2.0 standard) acquired from the Hotspot 2.0 compatible WLAN AP. The user equipment may determine whether the corresponding WLAN access network is subjected to overload/congestion by comparing the determined load value with a predetermined value defined in the policy provided from the ANDSF.

Enhanced Solution for Access Network Selection

If the user equipment has both H-policy (that is, a policy provided by H-ANDSF, information including an ANDSF related policy configured for the user equipment by HPLMN, a policy received by the user equipment from the H-ANDSF, etc.) and V-policy (that is, a policy provided by V-ANDSF) (for example, in case of user equipment in roaming state), user equipment operation according to definition of the related art is that V-policy is first used.

Meanwhile, in the aforementioned scenario as illustrated in FIG. 7, since the user equipment can use neither V-ANDSF of VPLMN1 nor V-ANDSF of VPLMN2, the user equipment should use the H-policy (that is, the user equipment complies with the policy provided from the H-ANDSF not the policy provided from the V-ANDSF of VPLMN to which the WLAN access selected or accessed by the user equipment belongs). In this way, in addition to the above scenario, various scenarios may occur, which comply with the policy provided from the H-ANDSF not the policy provided from the V-ANDSF of VPLMN to which the WLAN access selected or accessed by the user equipment belongs.

In this case (that is, the case where the roaming user equipment should comply with the H-policy not the V-policy), if a solution for using load information of WLAN in WLAN selection is used, the roaming user equipment may select WLAN, which belongs to VPLMN, by using WLAN selection related policy information provided from the H-ANDSF.

At this time, even though a mechanism (for example, method/function/equation for estimating/measuring/calculating a load value) for determining load information is equally applied to all the PLMNs, policy information (for example, threshold value information) which is a criterion for determining that a random WLAN access network is in overload/congestion state may be varied for each PLMN. In more detail, WLAN load related policy information (that is, policy information which is a criterion of overload/congestion state of the WLAN access network) may be varied for each ADNSF which belongs to each PLMN.

For example, it may be assumed that WLAN load related policy information (that is, threshold value according to H-policy) provided from the H-ANDSF of the user equipment is higher than WLAN load related policy information (that is, threshold value according to the V-policy) provided from the V-ANDSF of the VPLMN to which WLAN selected or to be accessed by the user equipment belongs. In this case, even though the same load value determined by the user equipment is applied to the WLAN access network selected/to be accessed by the user equipment, the WLAN is determined to be in the overload/congestion state based on the V-policy, whereas the WLAN is determined not to be in the overload/congestion state based on the H-policy. That is, one WLAN may be determined to be in the overload/congestion state (that is, non-accessible) or not to be in the overload/congestion state (that is, accessible) depending on a policy of a PLMN (or ANDSF) with which the user equipment complies.

As a more detailed example, it is assumed that a WLAN load value measured by the user equipment may have a value between 0 and 100. Also, it is assumed that if the WLAN load value is 60 or more, it may regard overload/congestion in accordance with the policy of VPLMN (that is, V-ANDSF) and if the WLAN load value is 80 or more, it may regard overload/congestion in accordance with the policy of HPLMN (that is, H-ANDSF). In this case, if the load value determined for WLAN#1 by the user equipment is 65, the corresponding user equipment may access the WLAN#1 in accordance with the H-policy. At this time, it may be regarded that the network (that is, V-PLMN) visited by the user equipment requests that the user equipment should not access the WLAN#1 as the WLAN#1 is in the overload/congestion state. In view of the VPLMN, as inbound roamers continue to access the WLAN#1, the overload/congestion state may be worsened. As a result, a problem may occur in that the VPLMN may not normally provide QoS (Quality of Service), which is desired to be provided through the WLAN, to its subscribers which use the WLAN#1.

The above problem may occur similarly even though the user equipment is configured to comply with the V-policy in the visited network. For example, according to the policy of VPLMN (that is, V-ANDSF), it is assumed that if the WLAN load value is 60 or more, it may regard overload/congestion in accordance with the policy of VPLMN (that is, V-ANDSF) and if the WLAN load value is 40 or more, it may regard overload/congestion in accordance with the policy of HPLMN (that is, H-ANDSF). In this case, if the load value determined for WLAN#1 by the user equipment is 50, the corresponding user equipment may access the WLAN#1 in accordance with the V-policy. At this time, although the HPLMN intends to maintain QoS of service subscribed by the corresponding user by restricting the corresponding user equipment not to access the WLAN of overload/congestion state in the visited network, a problem may occur in that the user equipment may receive an unwanted service in accordance with the H-policy by accessing the corresponding WLAN, which is regarded as an accessible network in accordance with the V-policy.

Therefore, the present invention suggests solutions for supporting user equipment operation which is efficient and exact if there is any conflict between policies to be considered in determining WLAN access network selection or access attempt in a visited network when a dual mode user equipment, which supports access to a cellular access network and/or WLAN access network, is accessing the visited network or is roaming in the visited network.

In the following description, complying with any policy should be understood that the corresponding policy is applied or used.

Also, in the following description, policies (for example, information/parameters defined in the standard documents 3GPP TS 23.402, TS 24.302, TS 24.312) provided from H-ANDSF or V-ANDSF are exemplarily described. However, it is to be understood that the policies include various policies (for example, policy information/parameters that reflect Hotspot 2.0 related information) which will be defined (or changed or added) later, without limitation to the above-described policies.

Also, in the following description, it is to be understood that the expression, the user equipment "connects to" includes "associate with" or "having an access to" unless described otherwise. Also, it is to be understood that the expression, the user equipment selects or tries to access a WLAN includes that the user equipment is performing or will perform procedures of connecting to the corresponding WLAN, being associated with the WLAN or accessing the WLAN.

Embodiment 1

According to this embodiment, if the user equipment which is roaming should comply with the H-policy not the V-policy or is operated in accordance with the H-policy, information included in a policy provided by V-ANDSF of a visited network (that is, VPLMN) to which a WLAN belongs may be used as reference information (hereinafter, referred to as "WLAN load related reference information") for determining overload/congestion of the WLAN.

The WLAN load related reference information may be defined as a threshold value which is a reference for determining an overload/congestion state of the WLAN.

Alternatively, the WLAN load related reference information may be defined as either a preference value considered during selection of the WLAN or a factor for determining a priority index. For example, if the WLAN load value is a predetermined value or more, the user equipment may be operated in such a manner that preference/priority of the WLAN is lowered.

The user equipment may be operated to always comply with the V-policy as above if the user equipment determines the overload/congestion state of the WLAN.

Alternatively, although the user equipment basically complies with the H-policy in determining the overload/congestion state of the WLAN, the user equipment may be operated to comply with the V-policy only if a separate configuration is provided (for example, only if information or signaling provided from the network is received). For example, the information or signaling provided from the network may be predetermined indication information or parameters included in the H-policy or the V-policy.

Otherwise, even in the case that the user equipment should basically be operated in accordance with the H-policy, the user equipment may compare the WLAN load related reference information included in the H-policy with the WLAN load related reference information included in the V-policy. As a result, the user equipment may be operated to determine the overload/congestion state of the WLAN in accordance with the V-policy only if a value of the WLAN load related reference information included in the V-policy is lower than a value of the WLAN load related reference information included in the H-policy. If the value of the WLAN load related reference information included in the H-policy is lower than the value of the WLAN load related reference information included in the V-policy, the user equipment may be operated to determine the overload/congestion state of the WLAN in accordance with the H-policy. If the policy information having the lower reference value is applied, the user equipment may avoid a WLAN access network of which possibility of overload/congestion is high, whereby the probability of a problem caused by increase of load for the WLAN may be lowered and the probability of providing a service desired by a user of the corresponding user equipment may be increased.

Also, although the user equipment basically complies with the H-policy in determining the overload/congestion state of the WLAN, the user equipment may be operated to comply with the lower reference information by comparing the WLAN load related reference information of the H-policy with the WLAN load related reference information of the V-policy only if a separate configuration is provided (for example, only if information or signaling provided from the network is received).

Embodiment 2

According to this embodiment, the user equipment which is roaming may be operated in accordance with the V-policy not the H-policy. In this case, information included in a policy provided by V-ANDSF of a visited network (that is, VPLMN) to which a WLAN belongs may be used as WLAN load related reference information.

In the aforementioned embodiment 1, the user equipment basically complies with the H-policy but the WLAN load related reference information complies with the V-policy, whereas in this embodiment 2, the user equipment complies with the V-policy of the VPLMN to which the WLAN belongs, in addition to the WLAN load related reference information.

In this way, the network may previously configure, for the user equipment, whether the user equipment may use the H-policy or the V-policy (even for other policy information which includes WLAN load related reference information).

For example, through the policy (that is, H-policy) provided from H-ANDSF of HPLMN of the user equipment, the network may configure which one of the H-policy and the V-policy should be used by the user equipment in the visited network (or during roaming). In this case, if the user equipment is configured to use the H-policy in the visited network, the user equipment operation follows the embodiment 1, whereas if the user equipment is configured to use the V-policy in the visited network, the user equipment operation may be defined in accordance with the embodiment 2.

The user equipment may be operated to always comply with the V-policy as above even in other case as well as the case where the user equipment determines the overload/congestion state of the WLAN.

Alternatively, even in other case as well as the case where the user equipment determines the overload/congestion state of the WLAN, the user equipment may be operated to comply with the V-policy only if a separate configuration is provided (for example, only if information or signaling provided from the network is received). For example, the information or signaling provided from the network may be predetermined indication information or parameters included in the H-policy or the V-policy.

Otherwise, even in the case that the user equipment should basically be operated in the visited network in accordance with the V-policy, the user equipment may compare the WLAN load related reference information included in the H-policy with the WLAN load related reference information included in the V-policy. As a result, the user equipment may be operated to determine the overload/congestion state of the WLAN in accordance with the H-policy only if a value of the WLAN load related reference information included in the H-policy is lower than a value of the WLAN load related reference information included in the V-policy. If the value of the WLAN load related reference information included in the V-policy is lower than the value of the WLAN load related reference information included in the H-policy, the user equipment may be operated to determine the overload/congestion state of the WLAN in accordance with the V-policy. If the policy information having the lower reference value is applied, the user equipment may avoid a WLAN access network of which possibility of overload/congestion is high, whereby the probability of a problem caused by increase of load for the WLAN may be lowered and the probability of providing a service desired by a user of the corresponding user equipment may be increased.

Also, even in other case as well as the case where the user equipment determines the overload/congestion state of the WLAN, the user equipment may be operated to comply with the lower reference information by comparing the WLAN load related reference information of the H-policy with the WLAN load related reference information of the V-policy only if a separate configuration is provided (for example, only if information or signaling provided from the network is received).

Figure 9:
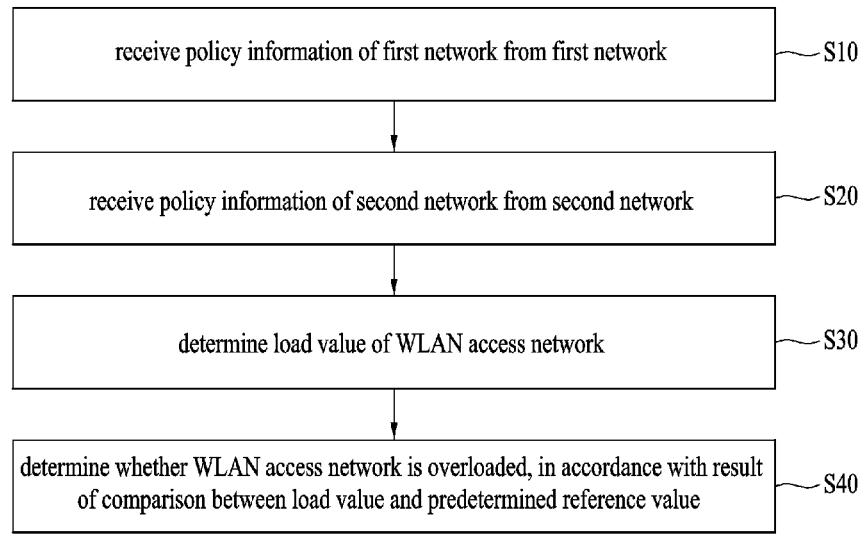
FIG. 9 is a flow chart illustrating a method for selecting a network in accordance with one embodiment of the present invention.

FIG. 9 is a flow chart illustrating a method for selecting a network in accordance with one embodiment of the present invention.

In step S10, the user equipment may receive policy information of a first network (for example, ANDSF server of the first network) from the first network.

In step S20, the user equipment may receive policy information of a second network (for example, ANDSF server of the second network) from the second network.

In step S30, the user equipment may determine a load value of the WLAN access network.

In step S40, the user equipment may determine overload of the WLAN access network in accordance with a resultant value of a comparison between the load value and a predetermined reference value.

If it is determined that the WLAN access network is not overloaded, the user equipment may try to access the WLAN access network.

In the example described with reference to FIG. 9, the first network may be a home network (for example, HPLMN), and the second network may be a visited network (for example, VPLMN). Alternatively, the first network may be a visited network (for example, VPLMN), and the second network may be a home network (for example, HPLMN). Even in any case, the WLAN access network belongs to the visited network (for example, VPLMN).

Also, the predetermined reference value may be determined in accordance with policy information of a specific network which is previously designated, or may be determined in accordance with the result of the comparison between the policy information provided from the first network and the policy information provided from the second network.

The details described in the aforementioned embodiments of the present invention may independently be applied to the detailed operation of the method described with reference to FIG. 9 or two or more embodiments may simultaneously be applied thereto, and repeated description will be omitted.

The exemplary method of FIG. 9 is described as a series of steps for clarity, but it is not a limitation of order of the steps and all or some of the steps may be performed simultaneously or in a different order. Further, not all of the steps described in the FIG. 9 are necessary for implementing the method proposed by the present invention.

Figure 10:
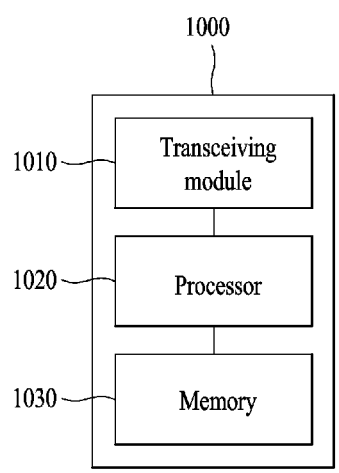
FIG. 10 is a block diagram illustrating a user equipment according to the preferred embodiment of the present invention.

FIG. 10 is a diagram illustrating the configuration of a user equipment according to an exemplary embodiment of the present invention.

Referring to FIG. 10, the user equipment 1000 according to the present invention may include a transceiving module 1010, a processor 1020 and a memory 1030. The transceiving module 1010 may be configured to transmit various signals, data and information to an external device and receive various signals, data and information from an external device. The user equipment 1000 may be connected with the external device through a wire cable and/or wirelessly. The processor 1020 may control overall operation of the user equipment 1000, and may be configured to perform a function for processing information transmitted or received between the user equipment 100 and the external device. Also, the processor 1020 may be configured to perform a user equipment operation suggested in the present invention. The memory 1030 may store the processed information for a predetermined time and may be replaced by a buffer (not shown).

The user equipment 1000 may be configured to perform access network selection in a wireless communication system. The processor 1020 of the user equipment may be configured to receive policy information of the first network through the transceiving module 1010 (or transceiver) and receive policy information of the second network through the transceiving module 1010. Also, the processor 1020 may be configured to determine a load value of a WLAN access network and determine overload of the WLAN access network in accordance with a result of a comparison between the load value and a predetermined reference value. If it is determined that the WLAN access network is not overloaded, the processor 1020 may be operated to allow the user equipment 1000 to try to access the WLAN access network.

The aforementioned detailed configuration of the user equipment 1000 may be implemented in such a manner that the aforementioned methods of the present invention and/or the details described in the aforementioned embodiments of the present invention may independently be applied to the detailed configuration of the user equipment 1000 or two or more methods and/or embodiments may simultaneously be applied thereto, and repeated description will be omitted for clarity.

The aforementioned embodiments of the present invention may be implemented by a variety of means, for example, hardware, firmware, software, or a combination thereof.

If the embodiments according to the present invention are implemented by hardware, the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiments according to the present invention are implemented by firmware or software, the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

The detailed description of the preferred embodiments of the present invention disclosed as above has been provided such that those skilled in the art may embody and carry out the present invention. While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. And, it is apparently understandable that an embodiment is configured by combining claims failing to have relation of explicit citation in the appended claims together or can be included as new claims by amendment after filing an application.

The above-mentioned embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

INDUSTRIAL APPLICABILITY

The aforementioned embodiments of the present invention may be applied to various wireless access systems.

The invention claimed is:

1. A method for enabling a user equipment to select an access network in a wireless communications system, the method comprising the steps of:
   receiving policy information of a first network;
   receiving policy information of a second network;
   determining a load value of a Wireless Local Area Network (WLAN) access network; and
   determining whether the WLAN access network is overloaded based on a resultant value obtained by comparing the load value with a predetermined reference value,
   trying to access the WLAN access network if the WLAN access network is not overloaded,
   wherein the predetermined reference value is determined by comparing first reference information, which is included in the policy information of the first network, with second reference information, which is included in the policy information of the second network,
   wherein the first reference information indicates a first value and the second reference information indicates a second value, and
   wherein the predetermined reference value is determined to be the first or second value, whichever is less.

2. The method according to claim 1, wherein information, included in the policy information of the first network or the policy information of the second network, indicates to the user equipment that the predetermined reference value should be determined in accordance with the lesser of the first and second value.

3. The method according to claim 1, wherein at least one of the first reference information and the second reference information includes at least one or more of Basic Service Set (BSS) load information, backhaul network speed information, and WLAN load information.

4. The method according to claim 1, wherein the user equipment is configured to be operated in accordance with the policy of the first network for an operation other than determining whether the WLAN access network is overloaded.

5. The method according to claim 1, wherein the user equipment is configured to be operated in accordance with the policy of the second network for an operation other than determining whether the WLAN access network is overloaded.

6. The method according to claim 1, wherein the policy information of the first network is provided to the user equipment by an access network discovery and selection function (ANDSF) that belongs to the first network, and the policy information of the second network is provided to the user equipment by an ANDSF that belongs to the second network.

7. The method according to claim 1, wherein the first network is a Home Public Land Mobile Network (HPLMN), and the second network is a Visited PLMN (VPLMN).

8. The method according to claim 1, wherein the first network is a VPLMN, and the second network is an HPLMN.

9. The method according to claim 1, wherein the user equipment is roaming.

10. The method according to claim 1, wherein the WLAN access network is located in a visited network.

11. The method according to claim 1, wherein a VPLMN of a cellular access network accessed by the user equipment is different from a VPLMN to which the WLAN belongs.

12. The method according to claim 1, wherein a VPLMN of a cellular access network accessed by the user equipment is the same as a VPLMN to which the WLAN belongs.

13. A user equipment for selecting an access network in a wireless communication system, the user equipment comprising:
   a transceiver; and
   a processor, connected to the transceiver, that:
   controls the transceiver to receive policy information of a first network, controls the transceiver to receive policy information of a second network, determines a load value of a Wireless Local Area Network (WLAN) access network, and determines whether the WLAN access network is overloaded based on a resultant value obtained by comparing the load value with a predetermined reference value,
   tries to access the WLAN access network if the WLAN access network is not overloaded,
   wherein the predetermined reference value is determined by comparing first reference information, which is included in the policy information of the first network, with second reference information, which is included in the policy information of the second network,
   wherein the first reference information indicates a first value and the second reference information indicates a second value, and
   wherein the predetermined reference value is determined to be the first or second value, whichever is less.

* * * * *